United States Patent Office 2,789,137
Patented Apr. 16, 1957

2,789,137

ACETIC ACID ANHYDRIDE

Walter Reppe, Ludwigshafen (Rhine), and Herbert Friederich, Worms, Germany, assignors to Badische Anilin- & Soda-Fabrik Aktiengesellschaft, Ludwigshafen (Rhine), Germany No Drawing. Application June 22, 1953,
Serial No. 363,417

Claims priority, application Germany June 28, 1952

4 Claims. (Cl. 260—546)

The present invention relates to the production of acetic acid anhydride. It is an object of this invention to provide a novel way to produce acetic acid anhydride starting from readily available chemicals, in particular dimethyl ether or methyl acetate.

It is already known to convert methanol to organic oxygen compounds, in particular acetic acid and methyl acetate by carbonylation in the presence of catalysts. This reaction proceeds with the best results when using as catalysts metals capable of forming metal carbonyls or their compounds in the presence of halogen in elementary form or in the form of halogen compounds.

It has already been proposed to carry out such carbonylations with dimethyl ether as the starting material, or to use a mixture of methyl acetate and water from which by saponification methanol will become free during carbonylation. In all these cases the acetic acid is obtained at least partly in the form of methyl acetate.

We have now found that it is possible to obtain acetic acid anhydride from dimethyl ether or methyl acetate. We are able to obtain this result by subjecting the starting material to the action of carbon monoxide in an anhydrous liquid reaction medium having dissolved therein cobalt bromide or iodide or a mixture thereof. The reaction itself is carried out under a pressure exceeding 200 atmospheres at temperatures below 250° C.

The reaction proceeds according to the following equations:

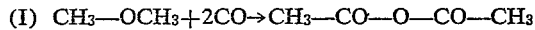

(I) $CH_3$—$OCH_3$+$2CO$→$CH_3$—$CO$—$O$—$CO$—$CH_3$ or, when starting from methyl acetate:

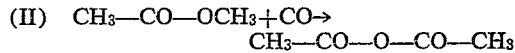

(II) $CH_3$—$CO$—$OCH_3$+$CO$→
$CH_3$—$CO$—$O$—$CO$—$CH_3$

Since Reaction II is part of the Reaction I it is possible to isolate methyl acetate when the conversion of dimethyl ether is not quantitative. Since we work in the absence of water it is not necessary to carry out the process in equipment made from high-alloyed stainless steel but we may work in ordinary high-pressure resistant apparatus.

We may use concentrated carbon monoxide for the carbonylation or mixtures of carbon monoxide with hydrogen, wherein the percentage of the carbon monoxide is at least 60 percent. The carbon monoxide may also contain inert gases, such as nitrogen or methane; however, it should be free from hydrogen sulfide. We prefer to work with gases which have been freed from any moisture in order to avoid the hydrolysis of the acetic acid anhydride formed in the carbonylation.

The pressure used should be in excess of 200 atmospheres, and we prefer to use as high a pressure as possible economically. Pressures between 400 and 800 atmospheres are preferred, though there is no objection against using higher pressures, such as 1000 or 1250 atmospheres. The reaction temperature should be in the range of 100–250° C., preferably between 150 and 220° C.

In the simplest method of working, the catalyst is used in the form of cobalt bromide or cobalt iodide or mixtures thereof. However, we may also use cobalt metal itself or other cobalt compounds in combination with free bromine or iodine or of compounds thereof, such as alkyl bromides or iodides. Of the halogens used, iodine and its compounds show the most effective catalytic performance.

We prefer to carry out our process under such conditions that the reaction mixture contains the catalyst at least partly in the dissolved state. Since cobalt bromide and iodide are not well soluble in dimethyl ether and methyl acetate, we prefer to use an additional inert solvent, and we have found that for this purpose the lower N-alkylated pyrrolidones, in particular N-methyl pyrrolidone, or acetic acid, or acetic anhydride itself are most suitable. However, the invention is in no way restricted to the use of these solvents, and the selection of the solvent does not constitute a principal feature of our invention.

The process may be carried out batchwise or continuously. It is not necessary to continue the action of the carbon monoxide or of the carbon monoxide-hydrogen mixture until the starting material has been converted completely, since it is very easy to recover the unchanged starting material and to use it again in the reaction. We prefer as a method for working up the reaction mixtures the simple fractional distillation, if desired under increased or reduced pressure. The catalyst used is found substantially quantitative in the distillation residue. It may be used again without further treatment. The concentration of the catalyst should be between 0.2 and 2 percent cobalt, calculated on the amount of the starting material. However, the amount of catalyst is no principal feature of our invention.

The following examples will further illustrate how this invention will be carried out in practice; the invention is not restricted to these examples. The parts are by weight, unless otherwise stated.

Example 1

A rotating autoclave is charged with a mixture of 150 parts of methyl acetate, 150 parts of N-methyl pyrrolidone and 10 parts of cobalt iodide and a mixture of 93 parts by volume of carbon monoxide and 7 parts by volume of hydrogen is pressed into the autoclave at 190° C. under 700 atmospheres for 17 hours.

The resulting liquid is fractionated. After unchanged methyl acetate 125 parts of acetic acid anhydride (60 percent conversion) are obtained. The N-methyl pyrrolidone and the catalyst may be used again.

Example 2

A mixture of 150 parts of methyl acetate, 150 parts of N-methyl pyrrolidone, 10 parts of anhydrous cobalt bromide and 5 parts of ethyl iodide is treated in the manner described in Example 1 at 190° C. with a mixture of 97 percent CO and 3 percent $H_2$ under 700 atmospheres for 15 hours. From the reaction mixture there are obtained by distillation unchanged ester, N-methyl pyrrolidone and 103 parts of acetic acid anhydride. The distillation residue contains a mixture of cobalt bromide and iodide.

Example 3

In the manner described in Example 1 a mixture of 150 parts of dimethyl ether, 150 parts of N-methyl pyrrolidone, 10 parts of anhydrous cobalt bromide and 5 parts of ethyl iodide is treated at 210° C. and under 700 atmospheres with a mixture of 96 percent CO and 4 percent $H_2$ for 12 hours. By fractionating the reaction mixture 46 parts of acetic acid anhydride are obtained besides unchanged dimethyl ether and 8.6 parts of methyl acetate.

When working under otherwise identical conditions at 500 atmospheres, it is necessary to continue the reaction for further 9 hours.

37 parts of acetic acid anhydride are formed at 210° C. and under 700 atmospheres when using acetic acid anhydride or acetic acid as the solvent.

*Example 4*

A mixture of 150 parts of methyl acetate, 150 parts of acetic acid anhydride and 10 parts of cobalt iodide is treated in the manner described in Example 1 with carbon monoxide under 700 atmospheres at 195° C. for 20 hours. 76 parts of acetic acid anhydride are formed, corresponding to a 37 percent conversion.

The following amounts of freshly formed acetic acid anhydride were found by varying the $CO:H_2$ ratio under otherwise identical conditions:

| $CO:H_2$ | Parts of anhydride |
|---|---|
| 95:5 | 83 |
| 90:10 | 77 |
| 85:15 | 73 |
| 80:20 | 75 |
| 70:30 | 48 |

We claim:

1. A process for the production of acetic acid anhydride which comprises treating in an anhydrous inert organic solvent medium, containing a catalyst consisting of a member of the group consisting of cobalt iodide, and a mixture of cobalt iodide and cobalt bromide, dimethyl ether with carbon monoxide under a pressure exceeding 400 atmospheres and at a temperature between 150 and 220° C.

2. A process as set forth in claim 1 wherein N-methyl pyrrolidone is used as the reaction medium.

3. A process as set forth in claim 1 wherein acetic acid anhydride is used as the reaction medium.

4. A process as set forth in claim 1 wherein a mixture of more than 60 percent of carbon monoxide and less than 40 percent of hydrogen is used.

References Cited in the file of this patent
UNITED STATES PATENTS

| | | |
|---|---|---|
| 2,075,100 | Dreyfus | Mar. 30, 1937 |
| 2,593,440 | Hagemeyer | Apr. 22, 1952 |
| 2,607,787 | Mason | Aug. 19, 1952 |
| 2,727,902 | Reppe et al. | Dec. 20, 1955 |
| 2,729,651 | Reppe et al. | Jan. 3, 1956 |
| 2,730,546 | Reppe et al. | Jan. 10, 1956 |